Figure 1:
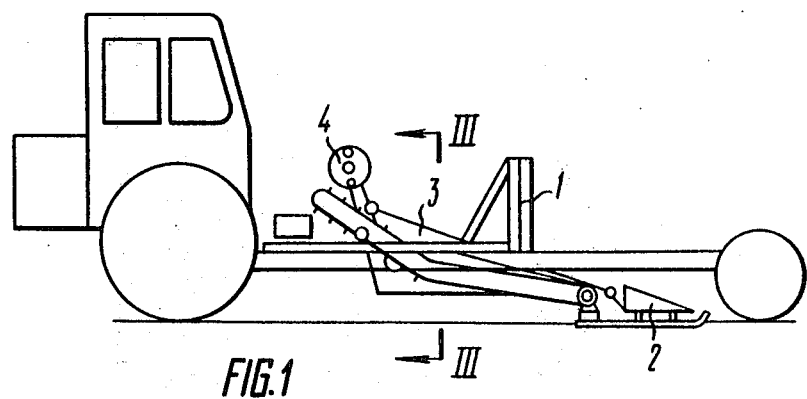

United States Patent [19]

Chichkin et al.

[11] 4,339,906
[45] Jul. 20, 1982

[54] VEGETABLE HARVESTING MACHINE

[76] Inventors: Valentin P. Chichkin, ulitsa Mira, 12, kv. 2; Efraim A. Shpigel, ulitsa Mira, 13, kv. 36; Gennady P. Gokin, ulitsa Mira, 13, kv. 20; Georgy E. Matjuschenko, ulitsa Junosti, 12/2, kv. 33; Nikolai N. Kurakov, ulitsa Mira, 7, kv. 1; Grigory B. Rabinovich, ulitsa Krasnodonskaya, 46, kv. 21, all of Tiraspol; Sergei A. Samoilovsky, ulitsa Gagarina, 225/1, kv. 14, selo Sukleya; Boris S. Angel, ulitsa Mira, 13, kv. 26, Tiraspol; Vladimir S. Ilienko, ulitsa Mira, 13, kv. 17, Tiraspol; Vladimir P. Miterev, ulitsa Mira, 19, kv. 2, Tiraspol; Leonid S. Zemlyanov, ulitsa Solnechnogorskaya, 10, kv. 15; Anatoly F. Krutkov, ulitsa S. Kovalevskoi, 2, korpus 4, kv. 40., both of Moscow, all of U.S.S.R.

[21] Appl. No.: 221,385

[22] Filed: Dec. 30, 1980

[51] Int. Cl.$^3$ ............................................. A01D 46/00
[52] U.S. Cl. .................................. 56/327 R; 56/130; 56/330
[58] Field of Search ............... 56/126, 130, 33, 327 R, 56/328 R, 330, 104, 27.5, 362

[56] References Cited

U.S. PATENT DOCUMENTS

| | | | |
|---|---|---|---|
| 2,881,579 | 4/1959 | Aasland | 56/104 |
| 3,720,051 | 3/1973 | Quick | 56/330 |
| 4,257,217 | 3/1981 | McClendon | 56/327 R |

FOREIGN PATENT DOCUMENTS 582783  12/1977  U.S.S.R. ............... 56/327 R

*Primary Examiner*—J. N. Eskovitz
*Attorney, Agent, or Firm*—Holman & Stern

[57] ABSTRACT

The present invention is characterized in that in a vegetable harvesting machine, primarily a sweet pepper harvesting machine, comprising a frame which mounts lifters designed to align the plants being harvested and guide them onto a fruit remover provided with an eccentric drive, and further comprising a system of conveyers for delivering the removed fruits outside the machine, said fruit remover is constructed as two walkers installed some distance apart and arranged to oscillate in antiphase, said walkers being attached to the lifters at one end and to the eccentric drive at the other. Each of said walkers is constructed as a rigid plate tapering toward the lifters. The throat between the walkers is adjustable.

5 Claims, 7 Drawing Figures

VEGETABLE HARVESTING MACHINE

The present invention relates to harvesting machines and has particular reference to vegetable harvesters, more specifically, to sweet pepper harvesters.

Pepper harvesting machines constructed according to the present invention may be used for harvesting machine-cropping pepper varieties grown for canning and table use.

The nutritive properties and vitamin content of the sweet pepper place it among the most valuable vegetables. The present trend with this crop is ever increasing production and yield, and further progress in pepper canning. At present, the world's pepper field is 250,000 hectares. Further spread of this crop is restrained by absence of appropriate harvesting machines, most of the pepper harvesting being done by hand.

The problem of mechanized harvesting of small-fruit pepper varieties grown for powder is being solved successfully in Bulgaria and Hungary. Pepper harvesting machines devised in these countries for that purpose operate substantially in the same manner on the principle of stripping peppers by means of a rotating drum with spring-loaded fingers. The stripped crop is cleaned of unwanted material in a system of fans and conveyers, and thereafter discharged into a transport vehicle running alongside the harvester.

Attempts to harvest canning varieties of the sweet pepper by the use of such machines have failed since they have resulted in injury to up to 68 percent of pepper fruits. This high percentage of injury is due to a high peripheral speed of the stripping fingers (the rotational speed of the drum is up to 240 rpm). The stripping fingers strike the fruits to detach them from the pepper plants, the striking force of the stripping fingers being too heavy for sweet peppers. It will be noted that sweet pepper fruits have to meet much more stringent ware quality requirements than peppers grown for powder.

A more advanced Bulgarian machine designed to harvest peppers for powder has a fruit remover constructed as a fork-shaped element installed obliquely and arranged to oscillate in a vertical plane. When the machine travels, pepper plants get between the prongs of the fork-shaped element and the oscillating movement of the latter causes the fruits to be detached from the plant.

This machine suffers from the following disadvantages:
 injury is caused to a substantial quantity of fruits;
 leaves and stalks are torn off and plants are uprooted;
 the fork-shaped removing element becomes choked with leaves and stalks every so often;
 the machine cannot handle pepper plants of different habitus.

These disadvantages are due to the fact that the prongs of the fork-shaped element are connected in a rigid manner.

It is the principal object of the present invention to provide a machine capable of harvesting machine-cropping varieties of vegetables for canning and table use.

It is another object of the present invention to devise a machine having a fruit remover that will provide for enhancing the quality of the harvested crop and increasing the output thereof.

It is still another object of the present invention to provide a machine which will not uproot plants and will have working elements free from chocking with leaves and stalks.

It is still another object of the present invention to provide a machine capable of harvesting vegetables of different plant habitus.

These and other objects are achieved in a machine for harvesting vegetables, primarily the sweet pepper, comprising a frame which mounts lifters designed to align the plants being harvested and guide them onto a fruit remover provided with an eccentric drive, and further comprising a system of conveyors for delivering the removed fruits outside the machine. According to the invention, the fruit remover is constructed as two walkers installed some distance apart and arranged to oscillate in antiphase. The walkers are attached to the lifters at one end and to the eccentric drive at the other.

The concept of the invention is as follows:

Investigation of the physicomechanical properties of sweet pepper plants and fruits has shown that the fruits are more easily removed from the plants when an upward bending force is applied to the fruit stem, since the required stem break-off force is substantially smaller in the upward direction than in the downward and sideward directions. The total of the forces required to break off all the fruits from the plant is less than the adhesion of the plant to the soil, which condition prevents the plant from being pulled out of the soil by the action of the harvester working element. This idea underlies the design of the harvester fruit remover.

The fruit remover is constructed so that its working part will move the fruit upward, thereby causing an upward bend of the fruit stem. To ensure fruit detachment from the plant, the fruit stem is subjected to multiple loading. To this end, the fruit remover is composed of two walkers set apart to provide a throat adjustable for the plant habitus. During the operation of the machine plants get between the walkers which act upon the fruits by tossing them until they are detached from the plants. At the same time walkers hold up the plants, preventing their vines from lowering. The walkers are installed obliquely, being articulated to the lifters at the lower end and to the eccentric drive at the upper end. The obliquity of the walkers is instrumental in detaching fruits located in different positions above the ground. Each walker is constructed as a rigid plate shaped to taper toward the lifter and arranged to oscillate in a vertical plane about a pivot point on the lifter. The walkers are articulated to the eccentric drive at two diametrically opposite points so that one walker is in the upper position when the other is in the lower position.

As the walkers oscillate about the pivot points on the lifters and the machine travels forward, the walkers alternately act upon the fruit stems, causing them to sharply bend toward the lower walker, whereby fruit detachment is accomplished.

The amplitude and frequency of fruit remover oscillations are chosen so as to ensure efficient fruit detachment.

Adjustment of the throat between the walkers is effected by the use of screw mechanisms.

Thus, in general, the working elements of the proposed machine are constructed and arranged so as to enable substantial reduction of fruit injury and increase of ware output per unit area.

As compared with the harvesters of the prior art, the machine of the present invention is more economical and features a simpler design and savings in the construction materials involved.

Figure 2:
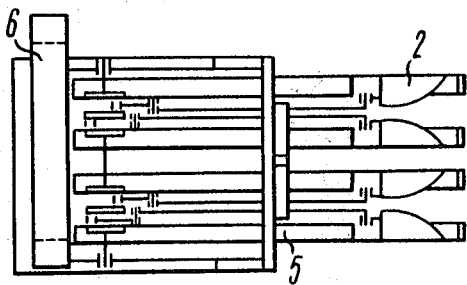
Figure 3:
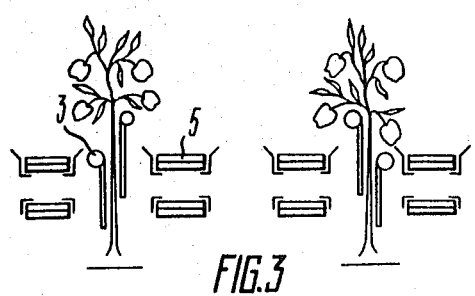
Figure 4:
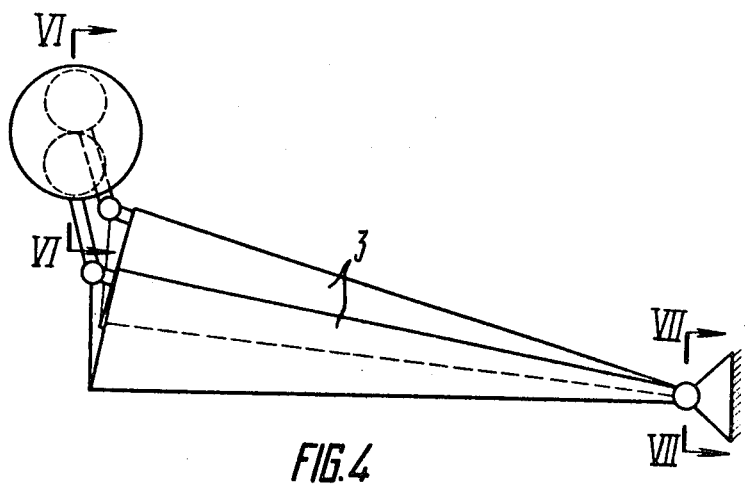
Figure 5:
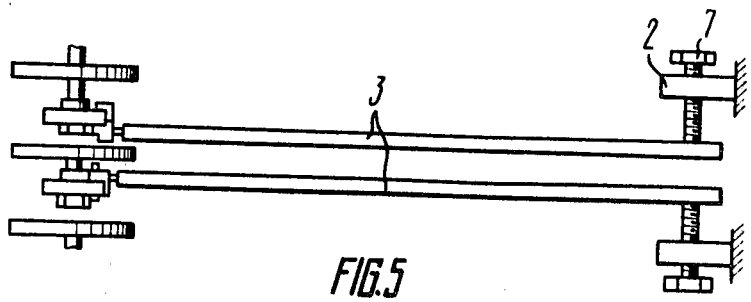
Figure 6:
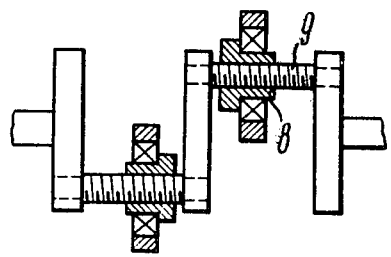
Figure 7:
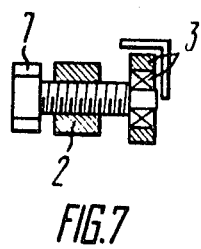

For a better understanding of the objects and advantages of the present invention, an embodiment thereof will now be described by way of example with reference to the accompanying drawings, wherein:

FIG. 1 is a general side view of the machine;
FIG. 2 is a top view of the same;
FIG. 3 is a sectional view on the line III—III of FIG. 1;
FIG. 4 is a side view of the fruit remover;
FIG. 5 is a top view of the fruit remover;
FIG. 6 is a cross sectional view on the line VI—VI of FIG. 4;
FIG. 7 is a cross sectional view on the line VII—VII of FIG. 4.

The vegetable harvester includes a three-dimensional rigid frame 1 (FIG. 1) made up of box-section bars and articulated to a chassis. By articulated the frame 1 to the chassis, lifters 2, which are mounted on guide skids, are enabled to follow the contour of the field. The fruit remover consists of two walkers 3 (FIGS. 1, 3, 4, 5 and 7) and an eccentric drive 4. The walkers are installed obliquely and articulated to the lifters 2 at the lower end and to the eccentric drive 4 at the upper end. Each walker 3 is constructed as a rigid plate tapering toward the lifters 2. The walkers 3 are attached to the eccentric drive 4 at diametrically opposite points. Longitudinal conveyers 5 (FIG. 2) are provided at both sides of the walkers 3. A discharge conveyer 6 is provided at the end of the longitudinal conveyers 5. The conveyers 5 and 6 constitute a system whereby the removed fruits are delivered outside the machine.

The lower end of each walker 3 is pivoted on a lower screw 7 (FIG. 7) attached to the lifter 2, whereas the upper end of each walker 3 is pivoted on a threaded bushing 8 mounted on a screw 9 (FIG. 6). This constructional arrangement of the pivots provides for adjusting the throat between the walkers 3. The adjustability of the walker throat and the obliquity of the walkers provide for harvesting peppers on plants of different habitus.

The machine is designed for mounting on a self-propelled chassis whose power takeoff is to provide drive for the operation of the machine.

The lifters are designed to be raised into the transport position and lowered into the working position by a hydraulic cylinder operated from the hydraulic system of the chassis (not shown).

Another embodiment of the machine may have a fan and an inclined trash separator (not shown).

The vegetable harvesting machine described above operates as follows:

As the machine travels in the field, the lifters 2 (FIG. 1) align the plants and guide them into the throat between the walkers 3 which oscillate in antiphase in a vertical plane. Fruits, including those lying on the ground, get onto the working part of the fruit remover where they are subjected to multiple upward loading which causes the fruit stems to bend and break off the plant. The removed fruits fall onto the longitudinal conveyers 5 (FIGS. 2 and 3), thence pass onto the discharge conveyer 6, and therefrom into a transport vehicle (not shown) running alongside the harvester.

As the machine travels further, the plants pass between the walkers. The throat between the walkers is adjusted to suit the plant habitus by turning the screws 7 and 9 (FIGS. 6 and 7).

As the machine proceeds, removing fruits from plants, the latter remain in the field. Operating in this manner, the machine performs harvesting on two rows of plants.

This invention may also be used to advantage in harvesting crops of the nightshade family on substantially large areas with a minimum of labor.

The nightshade family is defined as a large family (Solanaceae) of plants chiefly of warm regions, generally having a round stem, rank smell, and watery sap, and including the tobaccos, red peppers, tomatoes, potatoes, petunias and eggplant.

What is claimed is:
1. A vegetable harvesting machine comprising:
a frame;
lifters designed for aligning the plants being harvested and mounted on said frame;
two walkers obliquely mounted on said frame and set some distance apart;
an eccentric drive designed to oscillate said walkers in antiphase in a vertical plane about a pivot point on the lifter for the purpose of detaching fruits from the plants guided onto the walkers by said lifters;
said walkers being attached to said lifters at one end and to said eccentric drive at the other end;
a system of conveyors for delivering the removed fruits outside the machine.
2. A machine as claimed in claim 1, wherein each walker is constructed as a rigid plate tapering toward the lifters.
3. A machine as claimed in claim 1, wherein the throat between said walkers is adjustable by means of a screw mechanism.
4. A machine as claimed in claim 1, 2 or 3 wherein the walkers are articulated to the eccentric drive at two diametrically opposite points so that one walker is in an upper position when the other walker is in a lower position, so that when the machine travels forward the walkers alternately act upon the fruit stems, causing them to bend sharply toward the lower walker and thereby detach.
5. The machine of claim 4 wherein the harvested crop is sweet pepper or eggplant.

* * * * *